Patented Oct. 10, 1944

2,360,207

UNITED STATES PATENT OFFICE 2,360,207

COMPOSITION OF MATTER AND METHOD FOR PRODUCING

Richard F. B. Cox, Wilmington, Del., assignor to Hercules Powder Company, Wilmington, Del., a corporation of Delaware No Drawing. Application December 31, 1943, Serial No. 516,515

8 Claims. (Cl. 260—100)

This invention relates to a new composition of matter and a method for preparing same.

Numerous dihydroabietic acids have been described in the art ranging in optical rotation from $(\alpha)_D$ —23° to +108° and in melting point from 141° to 218° C. Also, dihydro-1-pimaric acids have been described ranging in optical rotation from $(\alpha)_D$+24° to 35° and in melting point from 135° to 144° C. Most of these dihydroabietic acids have been shown to be convertible to an individual lactone melting at 131° to 132° C. and known as the lactone of hydroxytetrahydroabietic acid. The dihydroabietic acids heretofore known have not been convertible into an oximinolactone by reaction with nitrosyl chloride, since the formation of the oximinolactone is characteristic of and indicative of the presence of a definite individual dihydroabietic acid which has never before been prepared in the art. Such an acid is absent in rosin, hydrogenated rosin and other well known mixtures of resin acids or their derivatives.

Now in accordance with this invention, it has been found that an heretofore unknown dihydroabietic acid of melting point 147° to 148° C. and specific rotation $(\alpha)_D$+68° may be produced by contacting a hydrogenated rosin ester, which is saturated to the extent of from about 25% to about 75% of both ethylenic double bonds, with a strong mineral acid, separating the treated ester from the reaction mixture, saponifying the ester, and thereafter treating with an acid to liberate a mixture of free dihydroabietic acids of which a new and heretofore unknown dihydroabietic acid is a component. Thus, it has been found that the methyl ester of hydrogenated rosin, which has been saturated with hydrogen to the extent of from about 25% to about 75% of both its ethylenic double bonds, may be contacted with concentrated sulfuric acid at a temperature of about —20° C. to about 120° C., the treated hydrogenated methyl ester separated from the sulfuric acid, saponified, and thereafter acidified to liberate free dihydroabietic acids of which a new dihydroabietic acid of melting point 147° to 148° C. and specific rotation $(\alpha)_D$+68° is a component.

Now having indicated in a general way the nature and purpose of the invention, the following examples illustrate the invention in detail. All parts expressed represent parts by weight unless otherwise indicated. All measurements of optical rotation were made on 2% solutions of the material in ethyl alcohol.

Example 1

One hundred parts of hydrogenated methyl ester of rosin of refractive index 1.518 (49% saturated) were added to 1800 parts of concentrated sulfuric acid (specific gravity 1.84) and the mixture stirred for one hour at 0° to 10° C. At the end of this time, the mixture was poured into ice water and the precipitate which formed was taken up in 300 parts of ether. The ether solution was washed with 200 parts of 2% sodium bicarbonate solution and then dried. The ether was evaporated, leaving a residue weighing 60 parts. The residue was saponified with 60 parts of potassium hydroxide dissolved in 250 parts of alcohol by heating at 78° C. for 24 hours. Upon acidification of the resulting solution with 10% hydrochloric acid, a mixture of dihydroabietic acids precipitated. The precipitate was separated, washed with water, and dissolved in 200 parts of ether. After drying, the ether was removed by evaporation. The mixture of acids thus obtained was dissolved in 40 parts glacial acetic acid. Then 3 parts butyl nitrite and 4 parts nitric acid (specific gravity 1.42) were added. After standing for an hour white crystals were filtered out and washed with methanol. They melted at 183° to 184° C. and amounted to 4 parts. The crystals were the oximinolactone of dihydroabietic acid of melting point 147° to 148° C. and specific rotation $(\alpha)_D$+68°.

Example 2

To 1800 parts of concentrated sulfuric acid (specific gravity 1.84) at 0° to 10° C. were added 750 parts of the hydrogenated methyl ester of rosin used in Example 1. After 45 minutes of stirring at this temperature, the mixture was poured into water causing a precipitate to form. The precipitate was dissolved in 1000 parts of ether and washed with 2000 parts of 2% sodium hydroxide to remove sulfonated products. After drying, the ether was evaporated from the solution leaving a residue weighing 456 parts. This was saponified by dissolving the residue in 2000 parts of alcohol containing 100 parts of sodium hydroxide and heating at 90° C. for 16 hours. The alcohol was then removed by evaporation leaving a residue consisting of a mixture of the sodium salts of dihydroabietic acids. The residue was dissolved in water and extracted with ether to remove neutral material. Upon acidification with a strong acid a mixture of dihydroabietic acids precipitated. From this mixture, 65 parts of the oximinolactone of dihydroabietic acid melting at 147° to 148° C. and of rotation $(\alpha)_D$+68° were obtained by treating the mixture in glacial acetic acid solution with nitrosyl chloride.

Example 3

To 1000 parts of concentrated sulfuric acid, specific gravity 1.84, at 0° to 10° C. were added 500 parts of hydrogenated ester gum (glycerol tris (dihydroabietate)) dissolved in 500 parts of carbon tetrachloride. After stirring for 2 hours, the mixture was poured into ice water, and the water-insoluble layer was washed with 200 parts of 2% sodium carbonate. The carbon tetrachloride was then evaporated leaving a residue to which 2000 parts of alcohol containing 100 parts of sodium hydroxide were added. The resulting solution was refluxed for 10 hours and poured into 1000 parts of water. After extracting the neutral material with petroleum ether there remained an aqueous solution of the salts of several resin acids. This solution was acidified with dilute sulfuric acid and the resin acids thus precipitated were taken up in petroleum ether. The mixture of acids produced in this manner contained the dihydroabietic acid of melting point 147° to 148° C. and $(\alpha)_D+68°$

Example 4

To 1000 parts of concentrated sulfuric acid, specific gravity 1.84, at 0° to 10° C. were added 500 parts of ethylene glycol bis (dihydroabietate) dissolved in 500 parts of carbon tetrachloride. After stirring for 2 hours, the mixture was poured into ice water, and the water-insoluble layer was washed with 200 parts of 2% sodium carbonate. The carbon tetrachloride was then evaporated leaving a residue to which 2000 parts of alcohol containing 100 parts of sodium hydroxide were added. The resulting solution was refluxed for 10 hours and poured into 1000 parts of water. After extracting the neutral material with petroleum ether there remained an aqueous solution of the salts of several resin acids. This solution was acidified with dilute sulfuric acid and the resin acids thus precipitated were taken up in petroleum ether. The mixture of acids produced in this manner contained the dihydroabietic acid of melting point 147° to 148° C. and $(\alpha)_D+68°$.

The hydrogenated rosin esters useful in the process of this invention are the esters obtained by esterification of hydrogenated rosin saturated to the extent of from about 25 to about 75% of both ethylenic double bonds, with either monohydric or polyhydric alcohols. Alternatively, the useful esters may be obtained by hydrogenation of monohydric or polyhydric alcohol esters of rosin until from about 25 to about 75% of the ethylenic double bonds of the rosin nucleus of the ester have become saturated. The alcohol component of the esters may be, for example, methyl alcohol, ethyl alcohol, propyl alcohol, butyl alcohol, benzyl alcohol, cyclohexanol, ethylene glycol, propylene glycol, diethylene glycol, triethylene glycol, glycerol, pentaerythritol, dipentaerythritol, etc. As hydrogenated rosin esters in the process, those saturated to an extent of from about 50 to about 60% will be preferred. The hydrogenated rosin esters may be used in either crude or refined form. The refined hydrogenated rosin esters useful in the process of this invention are the esters of dihydroabietic acid.

The mineral acids useful in the process of this invention may be any strong mineral acid such as sulfuric acid, hydrochloric acid, hydrobromic acid, hydroiodic acid, hydrofluoric acid, a phosphoric acid, etc. It is preferred, however, to use sulfuric acid.

The strong mineral acids, to be useful in the process of this invention should be employed in their concentrated form. Thus, sulfuric and phosphoric acids should be employed in concentrations of at least about 85%. The halogen acids may be employed either as the 100% acid in gaseous form or in solutions containing at least about 35% concentration such as is found in the concentrated halogen acids of commerce.

The process of this invention may be carried out either in the presence or in the absence of a solvent, but it is preferable that little or no water be present in addition to that contained in the concentrated mineral acid employed. Any inert solvent may be used as diluent. By inert solvent, it is meant any solvent which will dissolve the reactants, but have no damaging effect upon them. Preferably no solvent is used but glacial acetic acid, carbon tetrachloride, benzene, etc., may be used if desired, the choice of solvent depending on the nature of the acid used in the treatment.

The temperature for carrying out the mineral acid treatment of the process may vary from about −20° C. to about 120° C. depending on the acid used, whether or not a solvent is used, etc. For example, low temperature are desirable when sulfuric acid is used, but high temperatures are more desirable with halogen acids in acetic acid solution. The preferred temperature range is from about −10° C. to about 30° C. when sulfuric acid is used and 30° C. to 100° C. when the treatment is carried out with halogen acids in acetic acid solution.

The length of the reaction period may vary from about 15 minutes to about 8 hours depending on other conditions under which the process is carried out such as temperature employed, acid used, concentration of the reactants, etc. Under preferred conditions, the reaction period may be from about 30 minutes to 2 hours.

Upon completion of the treatment of the hydrogenated rosin ester with mineral acid, the reaction mixture contains the esters of several dihydroabietic acids. These esters may be separated from the reaction mixture by any suitable means. For example, the reaction mixture may be poured into water and the resulting precipitate dissolved in a solvent for the esters such as ether, petroleum ether, butyl alcohol, benzene, dipropyl ketone, ethyl acetate, chloroform, etc. Ether is a preferred solvent.

The solution of dihydroabietic acid esters may then be washed with an aqueous alkali solution such as dilute sodium hydroxide, sodium bicarbonate, potassium carbonate, sodium acetate, potassium hydroxide, etc., to remove acidic substances. The esters may be obtained by evaporation of the solvent from the solution.

In carrying out the process of this invention, the mixture of esters, obtained as shown above, may be saponified with alkalies such as the hydroxides of sodium, lithium, and potassium, etc., in either aqueous or alcoholic solution to produce a mixture of salts of dihydroabietic acid from which a mixture of the free dihydroabietic acids may be obtained by acidification.

Separation of the dihydroabietic acid melting at 147° to 148° C. in the form of its oximinolactone may be conveniently accomplished by treating the mixture of dihydroabietic acids with nitrosyl chloride. The dihydroabietic acid melting at 147° to 148° C. reacts to form a very insoluble oximinolactone which may be separated from the reaction mixture by filtration or any other convenient means.

The new dihydroabietic acid produced according to the process of this invention possesses unique chemical and physical properties and has never before been described in the art. It melts at 147° to 148° C. and has optical rotation $(\alpha)_D+68°$. It is stable to air, but oxidizes slowly with neutral 2% potassium permanganate solution. It is also stable toward isomerization in 1% alcoholic hydrochloric acid and in boiling glacial acetic acid. This new dihydroabietic acid has the characteristics of reacting with halogens to give a monohalolactone of hydroxytetrahydroabietic acid and with nitrosyl chloride to give a lactone of oximinohydroxytetrahydroabietic acid.

The reaction with nitrosyl chloride offers an excellent method of analyzing for this dihydroabietic acid in mixtures since the lactone of oximinohydroxytetrahydroabietic acid is extremely insoluble. Oximinolactones cannot be detected when nitrosyl chloride is added to hydrogenated rosin, rosin from saponified methyl esters of rosin, hydrogenated abietic acid, hydrogenated 1-pimaric acid or individual dihydroresin acids crystallized from the mixtures. This new dihydroabietic acid melting at 147° to 148° C. has not been present in previous dihydroabietic acid mixtures or compositions.

The new and heretofore unkown dihydroabietic acid produced according to the process of this invention is useful for synthesis. For example, the oximinolactone may be produced and then be reduced to the corresponding aminolactone.

What I claim and desire to protect by Letters Patent is:

1. A process for producing a dihydroabietic acid of melting point 147° to 148° C. and specific rotation $(\alpha)_D + 68°$ which comprises contacting a hydrogenated rosin ester, which is saturated to the extent of from about 25% to about 75% of the ethylenic double bonds, with a strong mineral acid at a temperature of about $-20°$ C. to about 120° C., separating the treated hydrogenated rosin ester from the mineral acid, saponifying the hydrogenated rosin ester, and thereafter treating with a water-soluble acid, thus liberating the free dihydroabietic acid of melting point 147° to 148° C. and specific rotation $(\alpha)_D + 68°$.

2. A process for producing a dihydroabietic acid of melting point 147° to 148° C. and specific rotation $(\alpha)_D + 68°$ which comprises contacting a hydrogenated rosin ester which is saturated to the extent of from about 25% to about 75% of the ethylenic double bonds, with concentrated sulfuric acid at a temperature of about $-10°$ to about 30° C., separating the treated hydrogenated rosin ester from the sulfuric acid, saponifying the hydrogenated rosin ester, and thereafter treating with a water-soluble acid, thus liberating the free dihydroabietic acid of melting point 147° to 148° C. and specific rotation $(\alpha)_D + 68°$.

3. A process for producing a dihydroabietic acid of melting point 147° to 148° C. and specific rotation $(\alpha)_D + 68°$ which comprises contacting a hydrogenated rosin ester, which is saturated to the extent of from about 25% to about 75% of the ethylenic double bonds, with a strong mineral acid in an inert solvent, at a temperature of about $-20°$ C. to about 120° C., separating the treated hydrogenated rosin ester from the mineral acid, saponifying the hydrogenated rosin ester, and thereafter treating with a water-soluble acid, thus liberating the free dihydroabietic acid of melting point 147° to 148° C. and specific rotation $(\alpha)_D + 68°$.

4. A process for producing a dihydroabietic acid of melting point 147° to 148° C. and specific rotation $(\alpha)_D + 68°$ which comprises contacting a hydrogenated monohydric alcohol rosin ester, which is saturated to the extent of from about 25% to about 75% of the ethylenic double bonds, with a strong mineral acid at a temperature of about $-20°$ C. to about 120° C., separating the treated hydrogenated rosin ester from the mineral acid, saponifying the hydrogenated rosin ester, and thereafter treating with a water-soluble acid, thus liberating the free dihydroabietic acid of melting point 147° to 148° C. and specific rotation $(\alpha)_D + 68°$.

5. A process for producing a dihydroabietic acid of melting point 147° to 148° C. and specific rotation $(\alpha)_D + 68°$ which comprises contacting a hydrogenated polyhydric alcohol rosin ester, which is saturated to the extent of from about 25% to about 75% of the ethylenic double bonds, with a strong mineral acid at a temperature of about $-20°$ C. to about 120° C., separating the treated hydrogenated rosin ester from the mineral acid, saponifying the hydrogenated rosin ester, and thereafter treating with a water-soluble acid, thus liberating the free dihydroabietic acid of melting point 147° to 148° C. and specific rotation $(\alpha)_D + 68°$.

6. A process for producing a dihydroabietic acid of melting point 147° to 148° C. and specific rotation $(\alpha)_D + 68°$ which comprises contacting the methyl ester of hydrogenated rosin, which is saturated to the extent of from about 25% to about 75% of the ethylenic double bonds, with a strong mineral acid at a temperature of about $-20°$ C. to about 120° C., separating the treated hydrogenated rosin ester from the mineral acid, saponifying the hydrogenated rosin ester, and thereafter treating with a water-soluble acid, thus liberating the free dihydroabietic acid of melting point 147° to 148° C. and specific rotation $(\alpha)_D + 68°$.

7. A process for producing a dihydroabietic acid of melting point 147° to 148° C. and specific rotation $(\alpha)_D + 68°$ which comprises contacting the methyl ester of hydrogenated rosin, which is saturated to the extent of from about 25% to about 75% of the ethylenic double bonds, with concentrated sulfuric acid at a temperature of about $-10°$ C. to about 30° C., separating the methyl ester of hydrogenated rosin from the sulfuric acid, saponifying the hydrogenated rosin methyl ester, and thereafter treating with a water-soluble acid, thus liberating the free dihydroabietic acid of melting point 147° to 148° C. and specific rotation $(\alpha)_D + 68°$.

8. A process for producing a dihydroabietic acid of melting point 147° to 148° C. and specific rotation $(\alpha)_D + 68°$ which comprises contacting the methyl ester of hydrogenated rosin, which is saturated to the extent of from about 50% to about 60% of the ethylenic double bonds, with concentrated sulfuric acid at a temperature of about $-10°$ C. to about 30° C., separating the methyl ester of hydrogenated rosin from the sulfuric acid, saponifying the hydrogenated methyl ester, and thereafter treating with a water-soluble acid, thus liberating the free dihydroabietic acid of melting point 147° to 148° C. and specific rotation $(\alpha)_D + 68°$.

RICHARD F. B. COX.